Feb. 20, 1968     D. W. NOLL     3,369,936
MULTIPLE PLATE BATTERY
Filed March 10, 1966
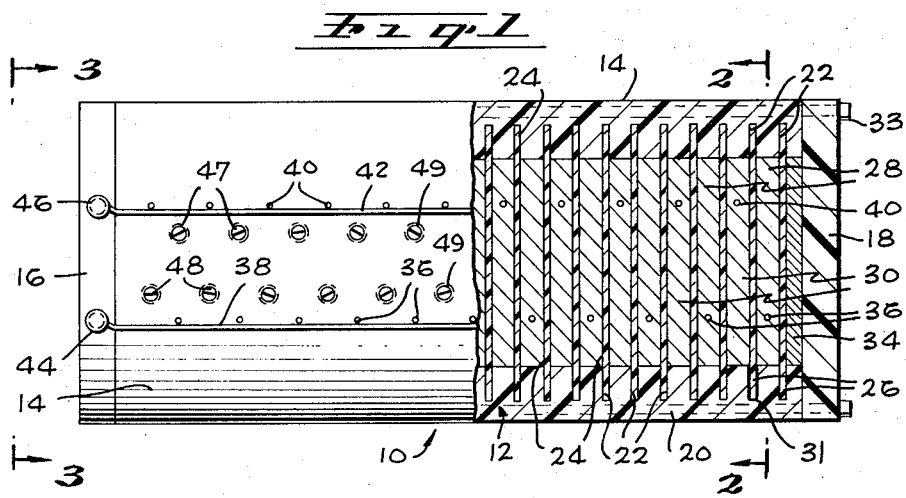
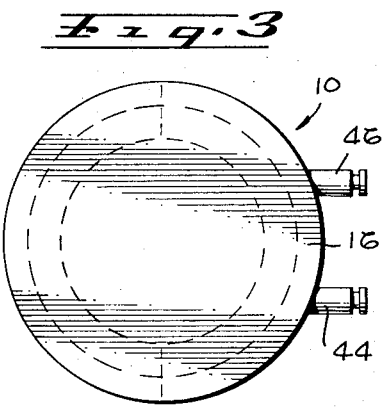
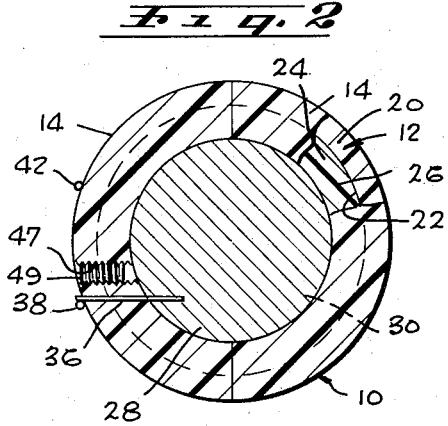
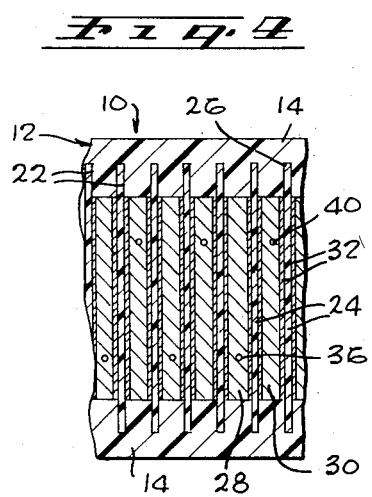
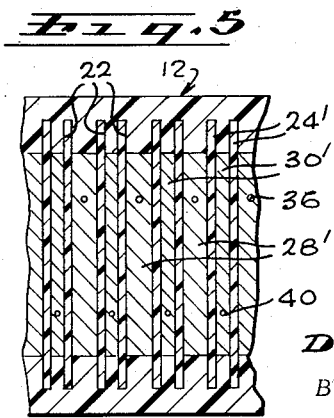
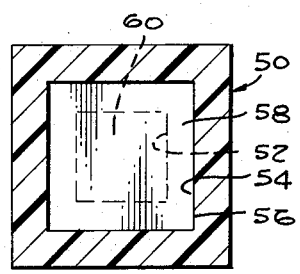
INVENTOR.
DAVID W. NOLL
BY Max Gilden
ATTORNEY United States Patent Office 3,369,936
Patented Feb. 20, 1968

3,369,936
MULTIPLE PLATE BATTERY
David W. Noll, Anaheim, Calif., assignor, by mesne assignments, to McDonnell Douglas Corporation, Santa Monica, Calif., a corporation of Maryland
Filed Mar. 10, 1966, Ser. No. 533,336
9 Claims. (Cl. 136—80)

This invention relates to a novel battery construction, and is particularly concerned with the provision of a simple multiplate battery construction particularly designed for use with rigid inorganic separators.

Batteries are an important source of energy storage for power generation. In addition to the common lead-acid storage battery, an important type of battery particularly suited for air-borne applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units, and the like. In such batteries, it is conventional to employ a separator in the form of a porous member between the electrodes to permit free passage of electrolyte ions.

In most practical applications in order to obtain a higher power output, multiple plate batteries or cells, e.g., of the types noted above, are employed. In the art of multiple plate cells one type of separator often employed between adjacent positive and negative electrodes is a semi-permeable or permeable sheet material, for example, regenerated cellulose, which is wrapped around the electrodes. Other types of separators, generally of an organic nature have also been utilized. Various modes of assembly of such separators in relation to the electrodes are shown in the prior art, but these modes of assembly often are relatively complex, and increase the battery cost.

It has been found that various porous inorganic separator materials such as hydrous metal oxides and aluminosilicates provide superior separator materials having improved properties over the organic separators, such as the regenerated cellulose separators of the prior art. Such improved inorganic separators are described and claimed in the copending applications Ser. No. 379,093 filed June 30, 1964 by Carl Berger et al.; Ser. No. 378,858 filed June 29, 1964, now abandoned by Carl Berger et al.; and Ser. No. 499,294 filed Oct. 21, 1965 by Carl Berger et al. However, such inorganic separators are in the form of rigid membranes or plates and thus such rigid porous inorganic separators cannot be assembled as in the case of the above noted flexible organic semi-permeable separators of the prior art, by wrapping around the electrode plates of a multiplate cell or battery. Further, when employing such rigid inorganic separators, it has been sought to avoid relatively complex modes of assembly of such improved inorganic separators, commonly encountered with respect to other types of organic separators employed in the prior art.

The instant invention provides a simple inexpensive and readily assembled battery construction employing substantially rigid inorganic separators, in which such separators are properly supported in relation to a series of negative and positive electrodes in a multiplate cell or battery, so that each separator is disposed between a pair of positive and negative electrodes of the battery.

Thus, a multiplate battery construction is provided according to the invention comprising a housing or case, which can be of any desired cross sectional configuration, e.g., in the form of a tube, a plurality of substantially rigid porous separators positioned in spaced substantially parallel relation in said case, a plurality of spaced slots or grooves provided in the interior wall of the case, the periphery of such separators being received in the slots, and a plurality of positive electrodes and a plurality of negative electrodes positioned in alternate relation to each other, with adjacent positive and negative electrodes separated by one of such separators. The slots in the wall of the case are so spaced from each other along the wall of the case as to provide for the positioning of an electrode between adjacent separators so that when the separators are positioned in the slots within the case and the electrodes assembled in position between the adjacent separators, a snug assembly is afforded with the separators positively retained in the slots, and the electrodes each being held in position substantially in contact with an adjacent pair of separators. The slots or grooves in the battery case wall may or may not be equally spaced, depending upon the thickness of the respective position and negative electrodes.

Where, for example, the battery case is tubular, the rigid separators are in the form of circular discs and the electrodes are in the form of circular plates, the separator discs being received in circular slots in the tubular wall and having a diameter greater than the electrodes, and the electrodes have a diameter substantially equal to the diameter of the interior wall of the tubular case. However, battery cases having an interior wall section or shape other than circular, e.g., square or elliptical, can be employed, and separators and electrodes of corresponding shapes can be utilized according to the invention.

Electrolyte fill ports can be provided in the battery case in communication with the respective electrodes to provide electrolyte for battery operation. A lead wire connects all of the positive, e.g., zinc electrodes, and a lead wire connects all of the negative, e.g., silver electrodes, and such lead wires in turn are connected to respective terminals on the exterior of the battery case.

If desired, the separators can be cemented in place in the grooves to ensure avoidance of leakage of electrolyte around the periphery of the separators in the slots or grooves.

As previously pointed out, the separator construction of the invention can be incorporated in any form of multiplate cell or battery, including the above noted conventional lead-acid multiplate cell, and the multiplate high energy density batteries such as a multiplate zinc-silver, silver-cadmium or nickel-cadmium cell.

The invention will be more clearly understood by reference to the description below of certain preferred embodiments, taken in connection with the accompanying drawing wherein:

FIG. 1 is a longitudinal view of a multiplate battery according to the invention, a portion of the case being broken away to show the alternate arrangement of positive and negative electrodes separated by the rigid inorganic separators;

FIG. 2 is a transverse section taken on line 2—2 of FIG. 1;

FIG. 3 is an end view of the battery taken on line 3—3 of FIG. 1;

FIG. 4 illustrates a modification of the battery construction of FIG. 1;

FIG. 5 illustrates another modification of the battery construction of FIG. 1; and FIG. 6 illustrates still another modification of the invention.

Referring to FIGS. 1 to 3 of the drawing, numeral 10 represents a multiplate battery in the form of a tubular housing or case 12 which can be in the form of two longitudinally extending half sections 14 for ease of assembly of the system of separators and electrodes in the case, as described in detail below, and end plates 16 and 18 are provided to close opposite ends of the tubular case 12. Case 12 and the opposite end plates 16 and 18 can be formed from any suitable material but preferably are formed of a plastic such as Teflon (tetrafluoroethylene polymer), Celon (chlorofluoroethylene polymer), Zytel (a nylon resin), Penton (a thermo-plastic resin derived from 3,3-bis (chloromethyl oxetane)), and the like.

The interior wall 20 of the plastic case 12 has formed therein a plurality of circular slots or grooves 22 which in this embodiment are spaced approximately equally from each other and extend substantially along the entire length of the tube. A plurality of porous rigid, preferably inorganic or ceramic, separators 24 in the form of relatively thin membranes or plates are mounted in the interior wall 20 of the tube by inserting the peripheral edge 26 of each of such inorganic separators 24 in a slot 22 in the tube wall.

Alternate zinc electrode plates or discs 28 and silver electrode plates or discs 30 are positioned along the interior wall 20 of the tube, with adjacent zinc and silver plates separated by a separator 24. The zinc and silver electrode discs 28 and 30 have a diameter substantially equal to the diameter of the interior wall 20 of the case, and have a thickness substantially equal to the distance between adjacent slots 22 in an axial direction along the tube. Thus, when the electrode discs 28 and 30 are assembled in alternate fashion as shown, and separated by the adjacent inorganic separators 24, the separators which are positively held within the slots 22, also firmly support the adjacent zinc and silver electrode plates 28 and 30 on opposite sides of each separator, the opposite faces of each of the zinc and silver electrode plates being substantially in contact with the adjacent separators 24. If desired, and as shown in FIG. 4, thin sheets of an inorganic material such as potassium titanate sheets 32 can be placed between the opposite faces of each of the zinc and silver electrode discs 28 and 30, and the adjacent separator discs 24.

The inorganic separator material which can be used to form the substantially rigid preferred inorganic separator plates or discs 24 can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Ser. No. 379,093 filed June 30, 1964 of Carl Berger et al. A preferred separator of this type is hydrous zirconium oxide or zirconia.

Other porous inorganic materials which can be employed for producing the substantially rigid separator include the aluminosilicates, particularly the alkali metal and alkaline earth metal aluminosilicates, due to their formation of a hard ceramic material upon sintering, while still retaining suitable porous characteristics. The aluminosilicate separators, preferbly in sintered form, have relatively low internal resistance. Examples of such aluminosilicates include aluminosilicate, sodium and potassium aluminosilicates, and magnesium, calcium, barium and strontium almuinosilicates. These materials can be used separately, but often mixtures of these aluminosilicates are used, e.g., complex mixtures of both the alkali metal and alkaline earth metal aluminosilicates. Such inorganic separator materials are described in the above mentioned copending U.S. applications Ser. Nos. 378,8⁀8, and 499,294 of Carl Berger et al.

The thickness of the inorganic separators or membranes 24 can vary, and can range, for example, from about 0.010 inch to about 0.030 inch, although this range is only understood to be exemplary. The thickness of the zinc and silver electrode discs 28 and 30 also can of course vary and can range from about 0.010 inch to about 0.150 inch.

The assembly of separators 24 and zinc and silver electrode discs 28 and 30, and also the potassium titanate papers 32, where employer, can be arranged by assembling these components as described above and illustrated in FIG. 1 in one of the half sections 14 of the case 12, and the other half section 14 thereafter positioned in place. If desired, the peripheral edge 26 of each of such separators can be cemented in its retaining slot 22, as indicated at 31, by use of a suitable cement, such as an epoxy cement, to provide better fluid sealing at such edge. The end plates 16 and 18 can then be mounted in any suitable manner as by screws at 33, or by adhesive, to the ends of the tubular case 12, to enclose the assembly, preferably employing an end spacer plate 34 between each of the end plates 16 and 18, and the enclosed multiple separator-electrode assembly.

To each of the zinc electrodes 28, there is connected a wire 36 which is brought through the case 12 and connected to a common zinc electrode lead wire 38 which extends longitudinally along the outside of the tube. Likewise, to each of the silver electrodes 30 there is connected a wire 40 which passes through the case 12, and each of such wires are connected to a common silver electrode lead wire 42 which extends longitudinally along the outside of the case. The zinc electrode lead wire 38 is connected to a terminal 44 mounted on end plate 16 of the case, and the silver electrode lead wire 42 is connected to another terminal 46 also mounted on end plate 16 adjacent terminal 44. A plurality of fill ports 47 are provided which are substantially equally spaced along the tube 12 and in communication with each of the zinc electrodes 28 for introducing electrolyte into such electrodes, and a plurality of like ports 48 are positioned longitudinally along the tube and substantially equally spaced from each other and in communication with the silver electrodes 30 for introducing electrolyte to the silver electrodes. After filling the respective electrode compartments for electrodes 28 and 30 with electrolyte, e.g., a potassium hydroxide solution, the fill ports 46 and 48 can be sealed by suitable means such as by screw covers or caps 49.

A 15 plate silver-zinc battery (8 electrode plates and 7 separators) of the type illustrated in FIGS. 1 to 4 had a capacity ranging from about 9 to about 15 ampere hours.

Referring to FIG. 5, there is shown a modified form of the invention device, employing zinc electrodes 28' and silver electrodes 30', the zinc electrodes being thicker than the silver electrodes. Accordingly, in this embodiment, the slots 22 for retaining the separators 24' are not equally spaced, but are spaced unequally to accommodate for the different thicknesses of such electrodes.

It will be understood that the principles of the invention can be applied with respect to a battery housing or case having any desired cross sectional configuration such as a rectangular, square or other geometric shape, instead of the tubular cross section of case shown at 12 in FIG. 1. Thus, for example, as illustrated in FIG. 6, the battery case 50 can be of square cross section and the interior wall 52 of such case provided with a square shaped slot 54 to receive the peripheral edge 56 of the square shaped inorganic separators 58. The electrode plates 60 have a square cross section and are of a size substantially equal to the square interior wall 52 of the case 50. The arrangement of the respective electrodes 60 and separators 58 of the embodiment of FIG. 5, is otherwise the same as that shown in FIG. 1.

From the foregoing, it is seen that the invention provides a simple compact and inexpensive multiplate battery construction in which substantially rigid, e.g., inorganic, separator plates are positively mounted in position on the interior wall of the case, and the respective electrodes of opposite polarity held firmly in position between respective separators. The construction of the invention aids in sealing the electrodes of opposite polarity, e.g., the zinc and silver electrodes, from each other.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A multiplate battery consisting of a housing, a plurality of substantially rigid porous separators positioned in spaced substantially parallel relation in said housing, a plurality of spaced slots formed substantially entirely around the interior wall of said housing, the entire periphery of said separators being received in said slots, forming enclosed electrode compartments between said separators, and a plurality of positive electrodes and a plurality of negative electrodes positioned in alternate relation to each other, with adjacent positive and negative electrodes separated by one of said separators, said electrodes being held in position in said electrode compartments between adjacent separators.

2. A multiplate battery as defined in claim 1, wherein said separators are rigid inorganic separators.

3. A multiplate battery as defined in claim 1, wherein said housing is tubular, and said separators are in the form of circular discs.

4. A multiplate battery as defined in claim 1, said separators being selected from the group consisting of a porous insoluble hydrous metal oxide and a porous aluminosilicate.

5. A multiplate battery as defined in claim 1, said case including a plurality of electrolyte fill holes communicating with said electrodes.

6. A multiplate battery as defined in claim 1, including a first lead wire connected to each of said positive electrodes and a second lead wire connected to each of said negative electrodes, first and second terminals mounted on the exterior of said housing, said first lead wire connected to one of said terminals and said second lead wire connected to the other of said terminals.

7. A multiplate battery as defined in claim 1, said positive electrodes being zinc electrodes and said negative electrodes being silver electrodes.

8. A multiplate battery as defined in claim 1, wherein the peripheral edges of said separators are cemented in said slots.

9. A multiplate battery consisting of a housing, the interior wall of said housing being of square cross section, a plurality of substantially rigid porous separators positioned in spaced substantially parallel relation in said housing, and a plurality of positive electrodes and a plurality of negative electrodes positioned in alternate relation to each other, with adjacent positive and negative electrodes separated by one of said separators, said separators and said electrodes being square, a plurality of spaced slots formed substantially entirely around the interior wall of said housing, the entire periphery of said separator squares being received in said slots, forming enclosed electrode compartments between said separators, said electrodes squares being substantially equal in size to the square interior cross section of said case, said electrodes being held in position in said electrode compartments between adjacent separators.

UNITED STATES PATENTS

References Cited

| | | | |
|---|---|---|---|
| 402,484 | 4/1889 | Schoop | 136—166 |
| 418,700 | 1/1890 | Dey | 136—143 |
| 537,575 | 4/1895 | Kroeker | 136—80 |
| 1,564,173 | 12/1925 | Ford et al. | 136—166 |
| 1,778,613 | 10/1930 | Von Grimmenstein | 136—143 |
| 1,874,404 | 8/1932 | Wood | 136—80 |
| 2,941,022 | 6/1960 | Mandel | 136—6 |
| 3,118,100 | 1/1964 | Chreitzberg | 136—30 |
| 3,202,546 | 8/1965 | Rightmire et al. | 136—86 |

ALLEN B. CURTIS, *Primary Examiner.*

WINSTON A. DOUGLAS, *Examiner.*

A. SKAPARS, *Assistant Examiner.*